Oct. 24, 1939.   F. P. MORRIS   2,177,326
CHUCK
Filed Sept. 7, 1937
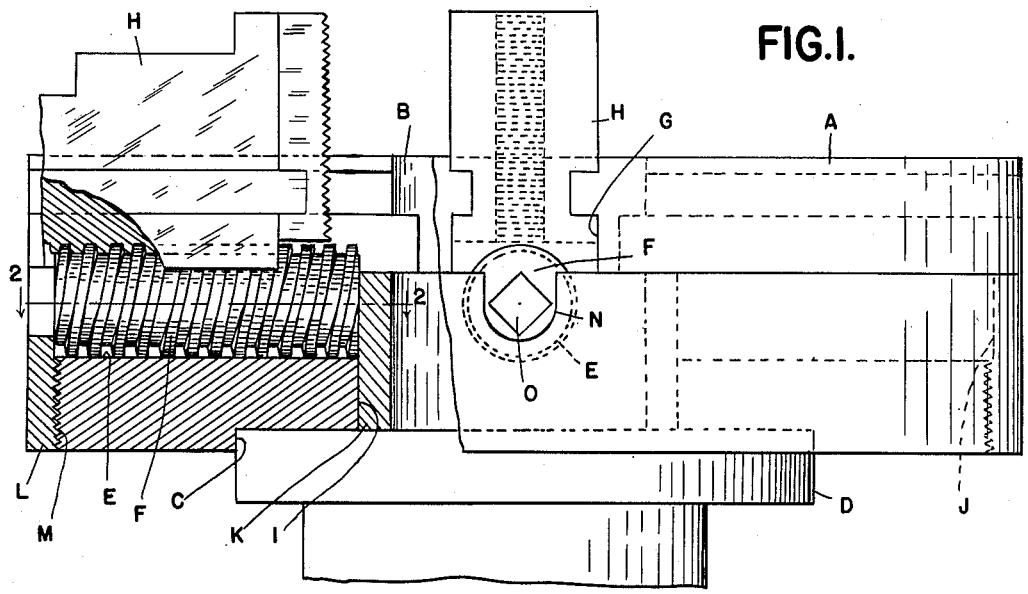
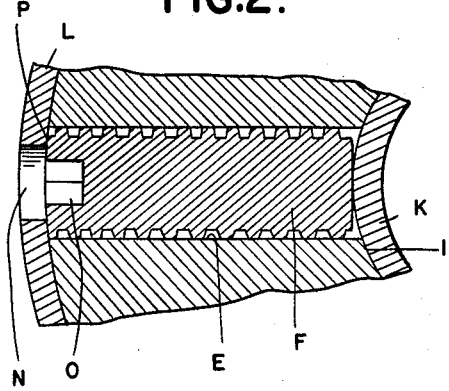
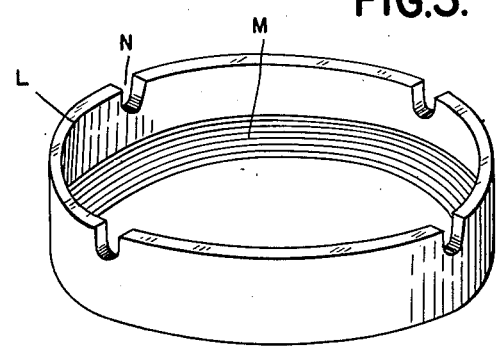
INVENTOR
FRANK P. MORRIS
BY
*Whittemore Hulbert & Belknap*
ATTORNEYS Patented Oct. 24, 1939

2,177,326

UNITED STATES PATENT OFFICE 2,177,326

CHUCK

Frank P. Morris, Detroit, Mich.

Application September 7, 1937, Serial No. 162,809

4 Claims. (Cl. 279—112)

The invention relates to rotary chucks of that type in which the jaws are individually adjustable, each being operated by a parallel screw in threaded engagement therewith and extending radially of the chuck body. It is the object of the invention, first to simplify the construction and to thereby reduce the cost of manufacture; second to expedite the reversing of the jaws to change from external to internal use or vice versa; third to facilitate the cleaning or removal of the chips. With these objects in view, the invention consists in the construction as hereinafter set forth.

In the drawing:

Figure 1 is a sectional side elevation of the chuck;

Figure 2 is a horizontal section on line 2—2 of Figure 1;

Figure 3 is a perspective view of the removable sleeve for retaining the frame.

With chucks of the type to which my improvement belongs the jaws are usually of a T-shaped cross section which slidably engages a radially extending undercut groove in the chuck body. The actuating screws are seated in recesses within the body, each being arranged beneath a jaw, which latter is threaded for engagement therewith. Inasmuch, however, as the screws take the radial thrust on the jaws, it is necessary to provide opposite end thrust bearings therefor which complicates manufacture. In other words, it is necessary that the screws should quite accurately fit the cylindrical recesses in which they are placed and at the same time end thrust bearings should project into said recesses to engage cooperating bearings on the screws. This in an integral construction of body precludes the drilling and reaming of the recesses by a tool introduced radially from outside the body.

With my improvement I have simplified the construction by dispensing with the integral end thrust bearings for the screws, thereby permitting the drilling and reaming of the recesses diametrically of the body. I then form thrust bearings by placing a bushing within the axial orifice of the chuck body and also a sleeve around the periphery thereof. These are extended over the ends of the screw to a point which just clears the guideways for the T-shaped heads of the jaws, thereby taking care of both the radially inward and radially outward thrusts.

In detail, A is the chuck body provided with the usual axial bore B and recess C on the rear side for engagement with a mounting head D. In the process of manufacture this head is first drilled radially or diametrically and the drilled holes are reamed to form cylindrical bearings E exactly fitting the screws F. The head is then milled to form T-shaped slots G and these are broached to exactly fit the jaws H. The head is also formed with a counterbore I in the axial bore B, and an annular recess J in the periphery, these being extended to the inner face of the T-shaped slots G. A bushing K is pressed into the counterbore I and a sleeve L is detachably engaged with the peripheral annular recess J.

In assembling the parts, the sleeve L is removed or withdrawn a sufficient distance to uncover the ends of the recesses E. The screws F are then introduced from the outside and as the length of these screws is exactly the same as the dimension between the inner face of the sleeve L and outer face of the bushing K, these members will form end thrust bearings. To facilitate the removal and replacement of the sleeve L it is preferably provided with a threaded portion M engaging a correspondingly threaded portion of the body A. The sleeve is also cut away at N to register with the end of the screw F and to permit of introducing a wrench into the socket O to rotate said screw. However, sufficient stock remains to form a thrust bearing P.

With chucks of this type, when the jaws are to be reversed it is usual to rotate the screws until the jaws are completely disengaged therefrom. They are then reversed and a reverse rotation of the screws will reengage then with their guideways. With my improved construction the sleeve L is unscrewed a sufficient distance to uncover the cylindrical recesses E. This will permit of together sliding the jaws and screws out of engagement with the chuck body and after reversal of the jaws the replacing of these parts in the same way; finally securing them by screwing inward the sleeve L. This same procedure may be followed whenever it is desired to clean the chuck, which requires much less time than cleaning in any other way. Thus, my improvement has many advantages over constructions that have heretofore been used.

What I claim as my invention is:

1. In a chuck, a body having an axial bore, a counterbore, and a radial bore intersecting the same and extending through the periphery on diametrically opposite sides, screws of uniform diameter throughout their length fitting within said radial bore on opposite sides of said axial bore, a bushing within said counterbore forming an inner end thrust bearing for said screws, and a sleeve surrounding said body and overlapping opposite ends of said bore to form an outward end thrust bearing for said screws being notched in registration with the latter for the insertion of a tool for rotating said screws.

2. In a chuck, a body having an axial bore, a counterbore, and one or more radial bores intersecting the same and extending through the periphery on diametrically opposite sides, screws of uniform diameter throughout their length fitting within each radial bore on opposite sides of said axial bore, a bushing in said counterbore overlapping said radial bores to form an inner end thrust bearing for each screw, a sleeve surrounding said body and overlapping said bores to form an outward end thrust bearing for each screw, said sleeve being cut away sufficiently for the insertion of a wrench into engagement with said screw but leaving a surrounding thrust bearing therefor, said sleeve having a threaded engagement with the periphery of said body for conveniently adjusting the same so as to uncover said radial bores.

3. In a chuck, a body having a cylindrical recess extending radially inward through the periphery, a screw of uniform diameter throughout its length slidable into said recess and rotatively fitting the same, an abutment for said screw at the inner end of said radial recess, a sleeve surrounding said body and overlapping said recess to form an end thrust bearing for said screw, said sleeve having a portion threadedly engaging a portion of said body permitting sufficient axial movement to uncover said recess for the removal and replacement of said screw.

4. In a chuck, a cylindrical body having an axial bore therethrough and a counterbore terminating in a shoulder, the periphery of said body having a portion opposite said counterbore slightly reduced in diameter to form an annular recess terminating in a shoulder and said body having radial bores extending completely through the diameter thereof and overlapping said shoulders, guideways in the front face of said body parallel to and intersecting said radial bores, a bushing in said counterbore against the shoulder thereof, screws of uniform diameter throughout their length slidable through the outer ends of said radial bores and rotatively fitting the same, their inner ends abutting against said bushing, jaws threaded for lateral engagement with said screws and slidable therewith into engagement with said guideways, and a sleeve engaging the annular recess formed by the portion of said periphery which is reduced in diameter and bearing against the shoulder thereof, said sleeve being notched for registration with said bores for the insertion of a turning tool but sufficiently overlapping said bores to form an outer end thrust bearing.

FRANK P. MORRIS.